(12) United States Patent
Cree

(10) Patent No.: US 6,926,858 B2
(45) Date of Patent: Aug. 9, 2005

(54) METHOD AND APPARATUS FOR REGULAR DIVISION OF MOLTEN EXTRUSION FLOW

(75) Inventor: Robert E. Cree, Newark, NY (US)

(73) Assignee: Addex, Inc., Stoughton, MA (US)

( * ) Notice: Subject to any disclaimer, the term of this patent is extended or adjusted under 35 U.S.C. 154(b) by 0 days.

(21) Appl. No.: 10/228,451

(22) Filed: Aug. 27, 2002

(65) Prior Publication Data

US 2002/0190422 A1 Dec. 19, 2002

Related U.S. Application Data

(63) Continuation of application No. 09/759,548, filed on Jan. 12, 2001, now Pat. No. 6,471,502, which is a continuation of application No. 08/702,917, filed on Aug. 26, 1996, now Pat. No. 6,190,152.

(51) Int. Cl.[7] .......................... B29C 47/06; B29C 47/20
(52) U.S. Cl. ............. 264/514; 264/173.12; 264/173.16; 425/133.1; 425/380; 425/462
(58) Field of Search .............................. 425/133.1, 380, 425/461, 433, 131.1, 133.5, 382.4, 462, 467, 326.1, 387.1, 191, 463, 381; 264/173.12, 173.16, 514, 171.1, 171.26, 171.27, 173.11, 173.15, 176.1, 209.1, 211.1

(56) References Cited

U.S. PATENT DOCUMENTS

| | | | |
|---|---|---|---|
| 3,966,861 A | 6/1976 | Papesh et al. | 264/95 |
| 4,038,017 A | 7/1977 | Langecker | 425/466 |
| 4,208,178 A | 6/1980 | Przytulla | 425/467 |
| 4,395,221 A | 7/1983 | Herrington | 425/467 |
| 4,492,549 A | 1/1985 | Rasmussen et al. | 425/131 |
| 5,046,938 A | 9/1991 | Hirschberger | 425/133 |
| 5,069,612 A | 12/1991 | Teutsch et al. | 425/133 |
| 5,076,776 A | 12/1991 | Yamada et al. | 425/133 |
| 5,538,411 A | 7/1996 | Gates | 425/133 |
| 5,667,818 A | 9/1997 | Guillemette | 425/133 |
| 5,716,650 A | 2/1998 | Mavridis | 425/133 |
| 6,190,152 B1 * | 2/2001 | Cree | 425/133.1 |

FOREIGN PATENT DOCUMENTS

| | | |
|---|---|---|
| DE | 90 03 537 | 7/1990 |
| DE | 42 18 095 | 12/1993 |
| EP | 0 252 388 | 1/1988 |
| EP | 0 419 983 | 4/1991 |
| FR | 2 308 490 | 11/1976 |
| WO | WO 89 00910 | 3/1989 |
| WO | WO 96 33856 | 10/1996 |

* cited by examiner

Primary Examiner—Joseph S. Del Sole
(74) Attorney, Agent, or Firm—Wilmer Culter Pickering Hale and Dorr LLP

(57) ABSTRACT

A blown film die divides a flow of material into two flows with higher and lower flow portions and recombines the flow by combining higher flow portions with lower flow portions. The flow can be divided in circumferential channels between an annular feed ring and an annular distribution ring.

10 Claims, 8 Drawing Sheets

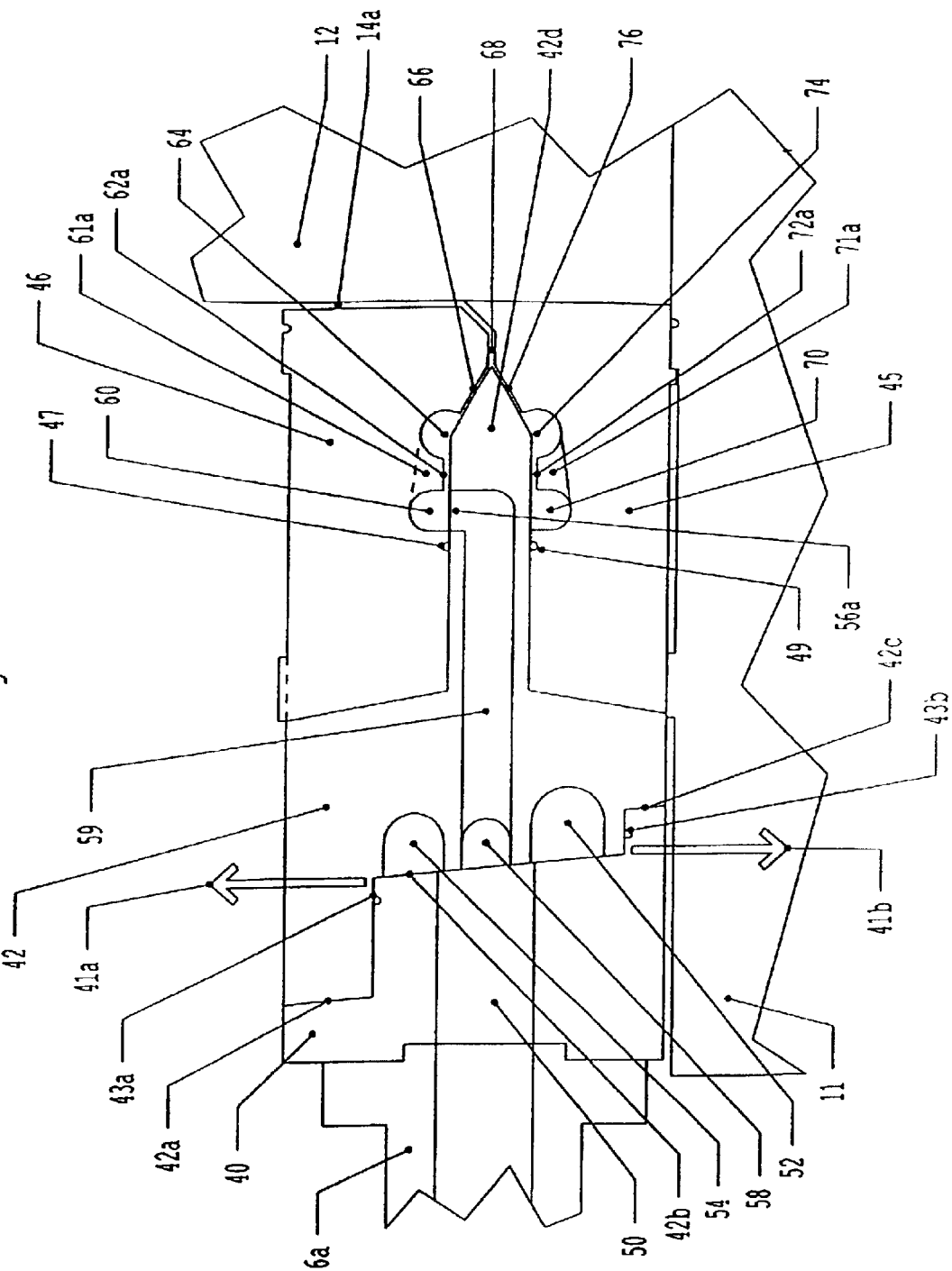

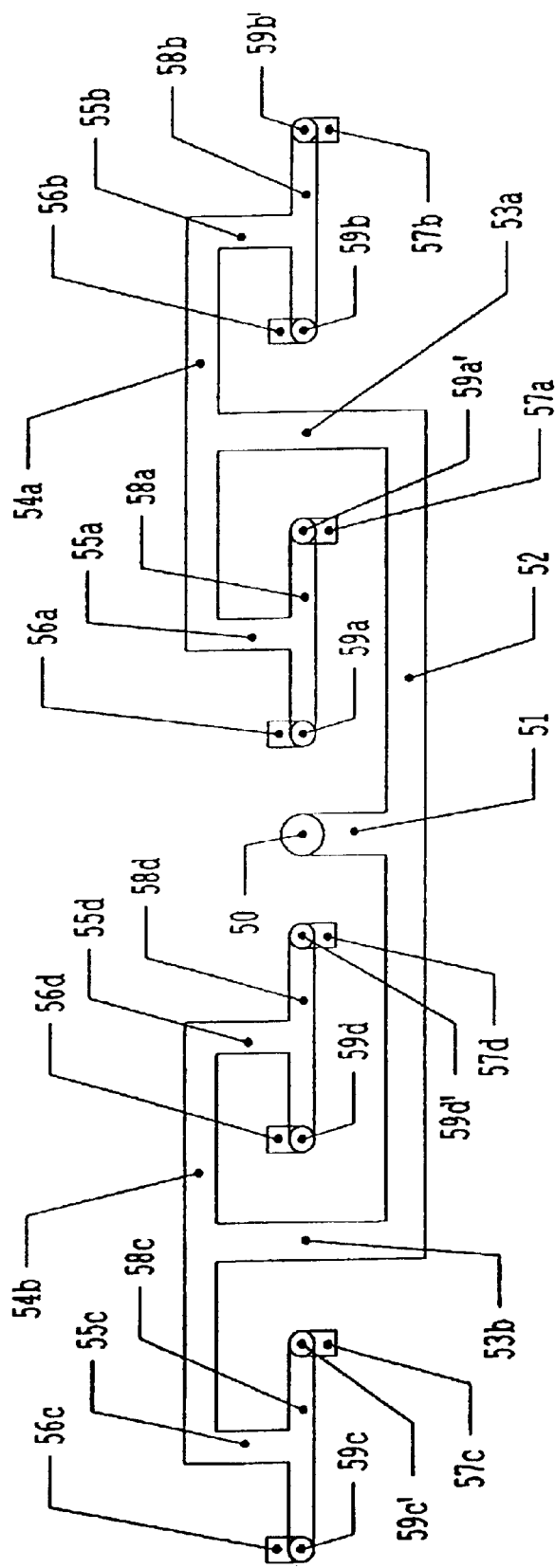

METHOD AND APPARATUS FOR REGULAR DIVISION OF MOLTEN EXTRUSION FLOW

CROSS-REFERENCE TO RELATED APPLICATION

This application is a continuation of application Ser. No. 09/759,548 filed Jan. 12, 2001, now U.S. Pat. No. 6,471,502 which is a continuation of application Ser. No. 08/702,917, filed Aug. 26, 1996, now U.S. Pat. No. 6,190,152.

FIELD OF THE INVENTION

The present invention relates to improving the quality of extruded annular products, particularly products produced by plastic resin extrusion lines and most particularly blown plastic film.

BACKGROUND OF THE INVENTION

In making such cylindrical products, the material from which the product is formed is extruded from an annular extrusion die and pulled along the die axis. In the case of blown film, plastic resin is extruded from a heated extruder having an annular die and the molten polymer is pulled away along the die axis in the form of an expanded bubble. After the resin cools to a set diameter as a result of application of cooling air, the bubble is collapsed and passes into nip rolls for further manufacturing steps.

As the film is extruded, thickness variations occur about the circumference of the bubble. The presence of thickness variations creates problems for downstream conversion equipment such as printing presses, laminators, or bag machines. In processes where the film is not converted in-line, but is wound onto a roll prior to converting, the thicker and thinner areas of many layers on the roll create hills and valleys on the roll surface which deform the film and magnify the subsequent converting problems especially with larger diameter rolls. It is therefore desirable to minimize such thickness variations, not only in blown film but in other extruded cylindrical products as well. To achieve this goal, processors use expensive equipment designed to randomize the position of these thick and thin areas over time or to automatically reduce the magnitude of these variations so that the finished roll is suitable for later converting steps.

It is recognized that thickness variations are caused by a variety of factors such as circumferential nonuniformity in flow distribution channels (ports and spirals) within the die, melt viscosity nonuniformity, and inconsistent annular die gaps through which the polymer exits the die. Flow distribution problems inside the die are of particular concern because they typically take the form of relatively sharp, closely spaced high and low spots which are commonly referred to as "port lines". Additionally, variability of the cooling air and non-uniformity of air aspirated into the cooling air stream from the atmosphere surrounding the extrusion line are major contributors to film thickness variation. Many film processors rely on conventional blown film equipment to determine the film thickness. This approach typically yields an average variation of +/−10 to 20% in film thickness overall, with the largest contributor typically being that of port lines.

It is desired to make improvements in the die to obtain higher quality film and other products so that the downstream equipment can be run faster and longer and so that the end use products will have more consistent thickness.

One major difficulty to overcome in designing a die is how to uniformly convert a typically non-uniform flow of molten polymer or other material that is conveyed to the die via a "melt" pipe into a relatively thin annular flow. Annular flow implies that there is an inner and outer forming wall as opposed to just an outer enclosing wall such as exists with the melt pipe. To introduce this inner forming wall into the molten stream requires that this new inner forming wall be rigidly fixed within the cavity of the outer enclosing wall of the die. To do this, connecting structures must be placed within the flow path of the molten material that temporarily disrupt the flow forming multiple, separate flows which then pass by the connecting structures and must be recombined in some way. Unfortunately, molten polymer exhibits non-uniform melt viscosity due mainly to variations in molecular level properties as well as local polymer temperature. These viscosity effects are collectively referred to as the rheology. One such property of major concern is that polymers exhibit "non-Newtonian" flow behavior. This means that the viscosity of the polymer changes depending on how fast it is moving through a given channel. The net effect when all viscosity effects are combined is that the polymer tends to segregate by viscosity making uniform recombination of multiple polymer flows very difficult. Additionally, molten polymer remembers its previous flow history and instead of seamlessly recombining, the multiple polymer flows tend to form unwanted "weld lines" where adjacent flows are recombined. The problem of weld lines intensifies when degradation of the polymer occurs due to low polymer flow rates.

Several approaches are presently employed to provide for connecting structure between the outer and inner forming walls of the die. One approach feeds from the centerline axis, a small distribution chamber in the die. This chamber separates and directs the polymer into several smaller, equally spaced pipes called ports, which diverge radially at some angle to the flow axis of the incoming melt. These ports convey the polymer out to a diameter appropriate for recombining into the annular flow which will exit the die. Another approach creates a mushroom shaped distribution chamber out of which relatively small, highly streamlined, spider-like connecting structures diverge radially at an angle to the flow axis that allow for quick recombination before forming the generally axial annular flow that exits the die. Yet another approach feeds the die radially from the side of the die and divides the flow one or more times through a network of flow channels similar to the branches of a tree, which ultimately convey the separate polymer streams to a diameter appropriate for recombining into the annular flow which will exit the die. Generally, one or more of the methods of flow separation must be employed in a blown film die, but each causes problems with segregation and potential for weld lines to form. Special recombination techniques must be employed to limit these effects.

Several techniques are used to recombine individual molten material flows into the annular flow that exits from the die. Some are designed to overlap the separate flows creating an onion-like layering effect, while others simply butt opposed flows up against each other and allow time, temperature and pressure to force recombination to occur.

In blown film production, the most common recombination technique commercially available employs channels which spiral around the axis of the die. These so-called spirals overlap one another and allow molten polymer to gradually bleed out of the channel over a "land", eventually to flow toward the annular exit of the die forming a layered, almost onion-like recombination flow. This annular flow of polymer exits the die at what is commonly referred to as the die lip. The major problem with this approach is that the flow channels and lands must be made non-uniform to compensate for non-Newtonian flow and other non-uniformities exhibited by the polymer. Unfortunately, major differences exist in the flow characteristics of various polymer materials that are processed. For a given die design, it may be possible to obtain even distribution around the flow annulus for one material, however it will not be even for others. Instead, other materials tend to form somewhat sinusoidal high and low flow spots in locations which depend on the material properties being processed. Thus the spiral design approach is limited in its capability to process a broad range of materials while simultaneously holding thickness variations to a consistent, predictable minimum.

A further problem is that the polymer or other material must necessarily take a long period of time to flow through the passages, i.e., a high residence time, which can lead to degradation of the material. Additionally, as the material flows through each passage, significant back pressure is created.

In "pancake" designs which incorporate distribution channels and the spirals substantially into the face of a plate that is coaxial with the flow axis of the die, the wetted surface area is quite large so that, when combined with higher pressures, resulting separation forces between adjacent plates can grow to be so large that the die cannot be held together. This forces the designer of such dies to limit the pressure magnitude which tends to degrade even distribution. Further, in many cases, lower pressure is attained by enlarging the flow passages; however this leads to higher residence time causing degradation of polymer properties. In practice, pressure and distribution effectiveness must be balanced which can lead to limitations on how large the die can be.

A less commonly used recombination approach does not overlap the flows but instead joins them at one or more discrete locations. In these locations where two opposed flows join together, the flow is very low causing the material to have very long residence times which degrades the polymer. This degraded polymer forms a distinct weld line that exhibits poor optical properties and reduced strength which have tended to limit the use of these designs. On the other hand, since there is no overlap, the flow channels are shorter than in overlap designs. This provides benefits in lower pressure and residence time which limits degradation and allows for larger designs. Non-overlapping designs also benefit from the clearly defined flow paths which force the polymer through the same geometry regardless of melt flow characteristics as opposed to the shifting around of the flow path associated with overlapping designs. This simplifies the die design process since non-Newtonian flow is well understood through defined geometries. Unfortunately, non-uniformities in distribution still occur as the melt flow characteristics change from those that were used to design the die. As a wider range of polymer choices are made available, this becomes more of a problem.

Processors are presented with a growing number of choices of extrusion materials, each with their own special properties. For example, some polymers resist water vapor, others resist oxygen penetration, still others provide high strength or resist puncture. Increasingly, processors are finding innovative uses for these materials, oftentimes finding it desirable to combine different polymers together in a layered or "coextruded" structure to yield property benefits in several areas. To do this, dies are designed with multiple entry points which distribute the polymer flow into separate annular flows and subsequently layer these flows one inside the other while still inside the die. Although non-overlapping designs have been used, most prevalent are overlapping designs either in a concentric or pancake configuration. Pancake designs are better suited to larger numbers of layers because the individual layers can be stacked one on top of each other. Concentric designs are limited to about 5 to 7 layers simply because the die grows so large in diameter as to become impracticable.

It has long been recognized that having multiple layers can provide a secondary benefit in that thickness variations present in each layer can somewhat offset one another. This has a drawback; since each layer's variation depends on associated melt flow properties, throughput rate, temperature, etc., the variations typically will not always average out. In fact, they can even align one on top of each other yielding no thickness averaging whatever. This is especially true of overlapping designs since the melt variations shift significantly in position and magnitude with even subtle changes in a given layer. Commercial coextrusion dies are designed with adjacent layer spirals that typically wrap in opposed directions in an effort to capitalize on this averaging effect. In the case of concentric die designs, the spirals for each layer are necessarily different in design because they do not spiral around at the same distance from the flow axis of the die. Pancake designs can be designed with the same mechanical geometry, however the path length to the die lip is necessarily different for each layer because they are stacked one on top of each other. This causes differences in the flow behavior since each layer operates at a different pressure. It has been observed that commercially available dies designed to capitalize on averaging effects exhibit both very good and very bad variation in total thickness as the throughput rate is raised through its full operating range. This occurs as resultant layer variations first oppose (good) then align (bad) with one another. An additional problem with these designs is that even if thickness variations are opposed, yielding good overall variation, the individual layer distribution can still be bad. This has a negative effect, especially when each layer is designed to take advantage of different film properties—the layers responsible for providing a barrier to oxygen and separately to water vapor can individually be highly variable even though the total thickness is uniform. It is highly desirable to achieve uniform distribution for each individual layer as well as for the combination of multiple layers.

SUMMARY OF THE INVENTION

The present invention features a regular division (RD) die which provides uniform distribution of molten extrusion material to each individual layer and exhibits a high degree of insensitivity to melt flow properties and a pressure resistive distribution system that does not limit the size of the die. This die design has particular application to the extrusion of polymeric blown film, but also applies to other forms of extrusion requiring an annular die. Blown film extrusion lines typically include a heated extruder for melting and pressurizing a flow of molten plastic resin, an annular die through which the molten resin extrudes and from which it is pulled away along an axis in the form of an expanding bubble, and an air cooling device constructed to direct cooling air into cooling contact with the bubble, to flow along the bubble and cause the molten resin to cool as the film expands until a substantially fixed maximum bubble diameter is achieved at a frost line spaced from the annular die.

The RD design may be included as an integral part of one or more individual die layers within the complete die. According to one preferred embodiment, the RD design is integrated separately in each layer of a pancake style stackable die. Each layer includes a series of concentric rings one inside of the other that performs the functions of feeding, distribution, and recombination. These rings surround and contact one another to allow the polymer to pass between them unimpeded through passages cut into the surfaces of and/or through them. The rings are bolted together forming a single unitized layer that is stacked face to face with the other layers of the complete die, each layer with its central geometrical axis being coaxial with the flow axis of the die. Polymer is separately fed into the outside diameter of the outer feed ring of each layer, the polymer passing straight radially through the feed ring wall to the radially interior associated distribution ring. For purposes of the ensuing discussion, the location of the input through the feed ring is at location 0°.

The distribution ring has flow channels machined into its radially outwardly-facing surface which act to divide the flow one or more times. Cutting the channels into the outside surface (or alternatively, the radially inwardly-facing surface, or both) eliminates the detrimental effects of separation forces caused by polymer pressure; the forces produced by the polymer act against the surrounding feed ring instead of on the bolts which hold the layer(s) together.

In the distribution ring, the polymer flow input from the feed ring is divided into an even number ($2^n$) of separate and equal flows. In the preferred embodiment, the input flow is divided into eight ($2^3$) flows, in three stages. The first division of flow occurs at 0°, at which point the polymer flow is divided in two and each half is directed into one of two channels, each of which wraps 90 degrees around the circumference of the ring, one clockwise from 0 degrees to 90 degrees and the other counter-clockwise from 0 degrees to 270 degrees. At the 90 and 270 degree points, each flow (half of the original) turns and travels axially for a short distance prior to being divided a second time. The second divisions occur separately at the 90° and 270° points; at each of which the flow is again divided in half and the resulting portion of the flow (one quarter of the total input flow) directed into one of a pair of channels which wrap 45° in opposite directions from, respectively, the 90° and 270° points, around the outside of the ring. These four flows end up at 45°, 135°, 225° and 315°; at which points the flow is divided again, this time into opposite wrap angles of 22.5. The end result of these three divisions is eight separate flows which end at 45 degree intervals at, respectively, 22.5°, 67.5°, 112.5°, . . . , 337.5°. It will be noted that, after each division, equal opposite wrap angles ensure that there is equal path length and thus equal pressure drop for any path through which the polymer might flow.

Each of these eight divided flows then passes radially inwardly through the first distribution ring, either directly to the recombination rings or, if further division is desired, to a second distribution ring. It will be recognized that, by using more than one distribution ring, a larger number "n" of divisions can be accomplished without pressure penalties. In any event, after the desired number of divisions are made in the distribution rings, the resulting flows are conveyed radially inwardly to the recombination rings through a divider plate that forms an integral part of the final (e.g., the most radially inward) distribution ring.

The divider plate is relatively thin (measured axially of the die) compared to the main body of the distribution ring of which it is a part. The divider plate extends inwardly from the portion of the final radially inward distribution ring that forms the $2^n$ polymer flows and tapers to a thin edge at its inner circumference. Within the divider plate, and generally prior to the taper, the $2^n$ radial flows are alternately diverted to one side of the plate or the other. This provides two separate but identical flow patterns, each of which includes $2^{(n-1)}$ recombination flows, issuing from ports located in either the upper or the lower face of the divider plate. These flows in turn are fed to a pair of recombination plates that abut the upper and lower faces of the divider plate.

One recombination plate is mounted on either side of the tapered portion of the divider plate. The recombination flow ports on one side of the divider plate are offset in such a way as to be centered between ports on the opposite side of the divider plate. This allows for precise, mirror image recombination to take place, "split" on opposite sides of the divider plate. These split, mirror-imaged flows join together at the inner edge of the divider plate. The recombination flow channels on each side of the divider plate are designed to create a flow distribution that, when added to its mirror image, results in a flat flow profile.

Insensitivity to melt rheology is attained by forcing the recombination plate flow to distribute in a non-overlapping manner, thus yielding predictable, non-shifting resultant polymer flow. Weld lines are avoided by placing an interceding land area directly in front of each port with the main flow channel passing on a diameter behind the land. Thus some of the flow from each port passes over the land and, of what remains, half flows down the channel one way and the other half flows in the opposite direction. Eventually the channel flow from one port meets opposite direction flow from the adjacent port. At this point, the main flow channel passes radially inward between the ends of adjacent lands. This creates a weld area, but because the weld area is in a high flow region the problem of polymer degradation is substantially eliminated. The main flow channel then splits again and passes on a diameter in front of each of the associated lands such that half flows down the channel one way and the other half goes the opposite direction. Thus the flow which originally was diverted around the land via the main flow channels is recombined with the land flow in a way which is predictably stable but yields a layered effect, similar to that produced in a spiral design but without shifts in position. The now annular and radially inwardly directed recombination flow passes over a final land to the tip of the divider plate where its mirror imaged split flow from the opposite side of the divider plate is added. The final channel and land are cut in such a way as to insure a smaller flow where the high flow weld line occurs and a larger flow centered on the interceding land. Upon addition of its mirror image, the deleterious effects of the weld area is minimized by the addition of the mirror images larger (non-weld) flow area.

The shape of the flow issuing from the recombination area on each side of the divider plate prior to the flows being recombined is important to achieving a combined uniform flow from opposite sides of the divider plate. Although for a given material, the individual flows from each half may also be uniform, they do not necessarily have to be. Rather, there is a wide diversity of curves which can be programmed into the design of the flow channels which after addition yield a uniformly flat combined profile. The mathematical study of "regular divisions of the plane" such as used in the study of crystallography or as can be found in graphical representations by M. C. Escher depict many suitable examples of both simple and complex profiles. A preferred profile for each split flow, is a straight line "triangle" profile which linearly increases from a minimum flow at the high flow weld to a maximum in line with the port. This profile repeats itself without discontinuity around the diameter of the layer. A second preferred split flow profile is a "sinusoidal" profile which also has its minimum at the high flow weld and maximum in line with the port.

BRIEF DESCRIPTION OF THE DRAWINGS

FIG. 4 is a partial cross sectional side view (taken at B—B of FIG. 4a) of one layer for the regular division die showing the general locations of the feed inlet, dividing channels, recombination ports and channels.

FIG. 4b is a schematic illustration, centered on the bore of the feed inlet of one layer of the regular division die of FIG. 1, showing the general locations of the feed inlet, dividing channels, recombination ports and channels on the exterior surface of the layer, as viewed looking radially inwardly.

DESCRIPTION OF THE PREFERRED EMBODIMENTS

Figure 1:
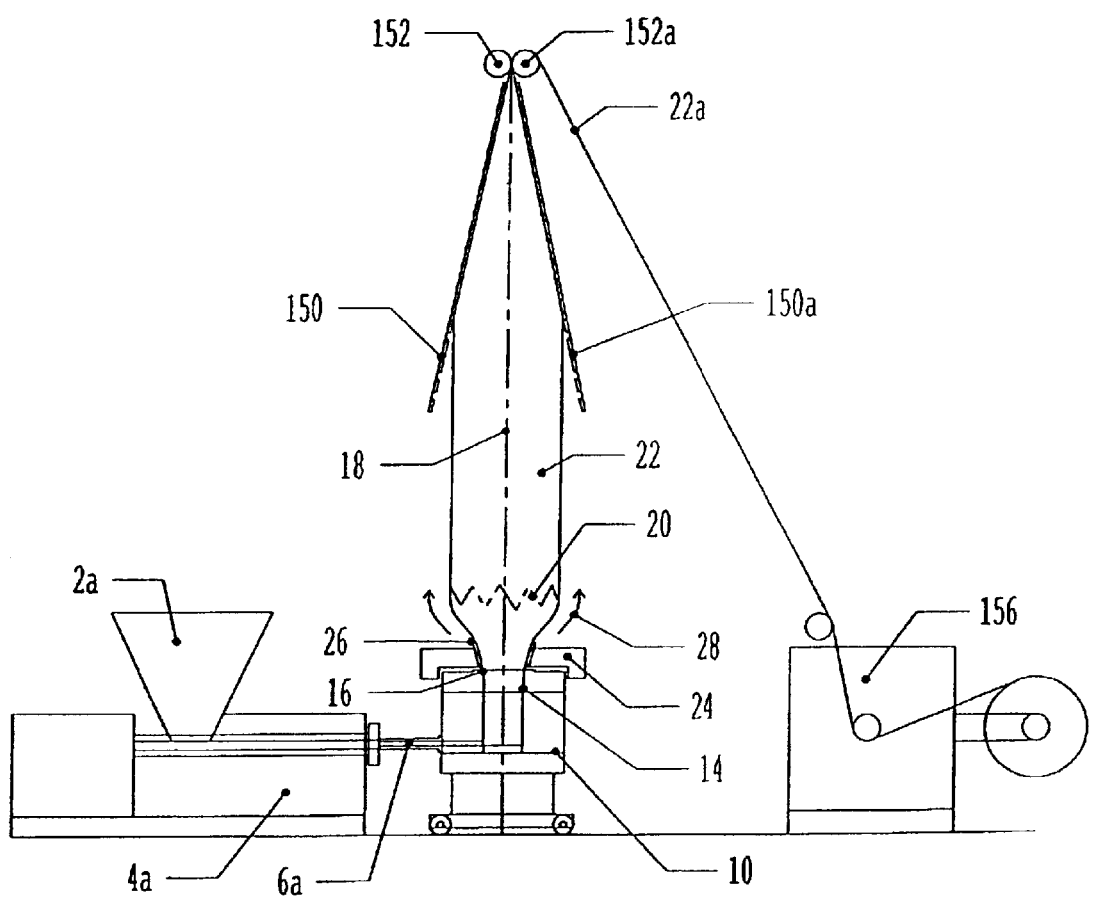
FIG. 1 is a schematic side view showing a blown film extrusion apparatus which includes a multi-layer regular division die according to the present invention.

FIG. 1 illustrates a blown film extrusion system in which molten plastic resin is extruded to form blown film. Except for the die 10, the system of FIG. 1 and its operation are generally conventional. In general, plastic pellets are fed into a feed hopper 2a and are transferred into an extruder 4a where they are melted, mixed and pressurized by the action of an extruder screw. The melt exits extruder 4a and is conveyed through melt pipe 6a where it is directed into blown film die 10. Die 10 is designed to form the melt into an annular, cylindrical plastic melt flow 14 which is then extruded from an annular orifice die lip 16 at the top of die 10. This annular melt flow is continually drawn away from the annular die lip 16 in a manner generally concentric with a process centerline 18. The annular diameter of the melt flow enlarges as it progresses from the die until it reaches frost line 20 (indicated diagrammatically by a saw-tooth line) to form a cooled, solidified plastic tubular film bubble 22.

Primary cooling air for the process is supplied to external air ring 24 from a conventional air source (not shown). The air is applied to contact the extruding plastic melt adjacent the base portion of the bubble by air ring lips 26. The air flows in annular air streams 28 along the outside expanding surface of the bubble. On some blown film processes, other forms of cooling are also employed. One such system (not shown) applies cooling air to the inside surface of the bubble, according to known techniques, and is commonly referred to as internal bubble cooling, or just "IBC". The plastic melt is cooled sufficiently to solidify into tubular bubble 22 at frost line 20.

Also according to known techniques, tubular bubble 22 is continually drawn upward through collapsing frame 150, 150a where it is compressed into a flat sheet of film 22a, also known as "layflat," as it passes through a nipping point between nip rolls 152 and 152a. These nip rolls are driven to continually pull the film through the extrusion process. Layflat film sheet 22a is then converted and/or wound into finished product by downstream processing equipment such as winder 156.

Figure 2:
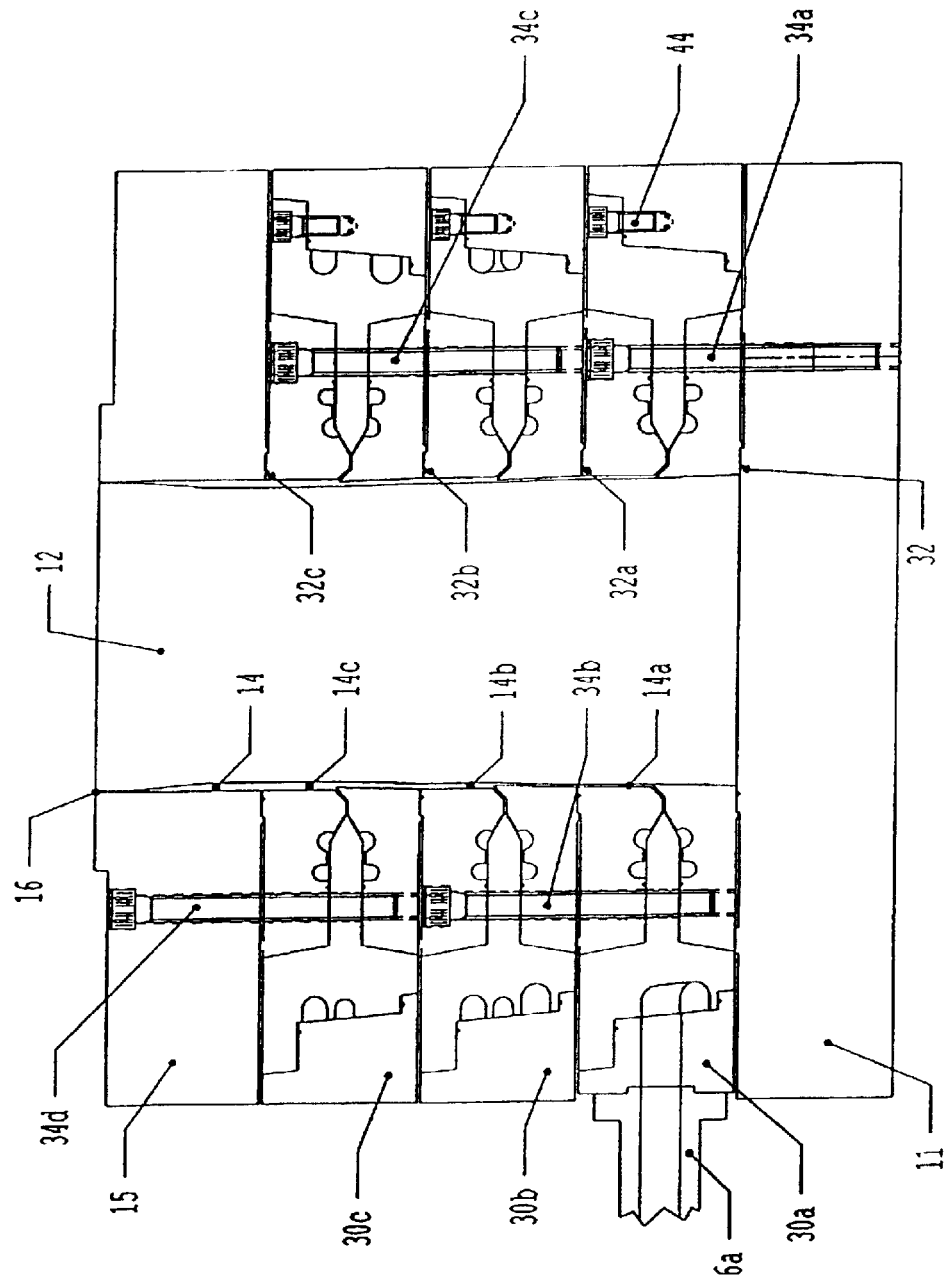
FIG. 2 is a schematic cross section (taken at A—A of FIG. 3) side view on an enlarged scale of the blown film extrusion regular division die of FIG. 1.
Figure 3:
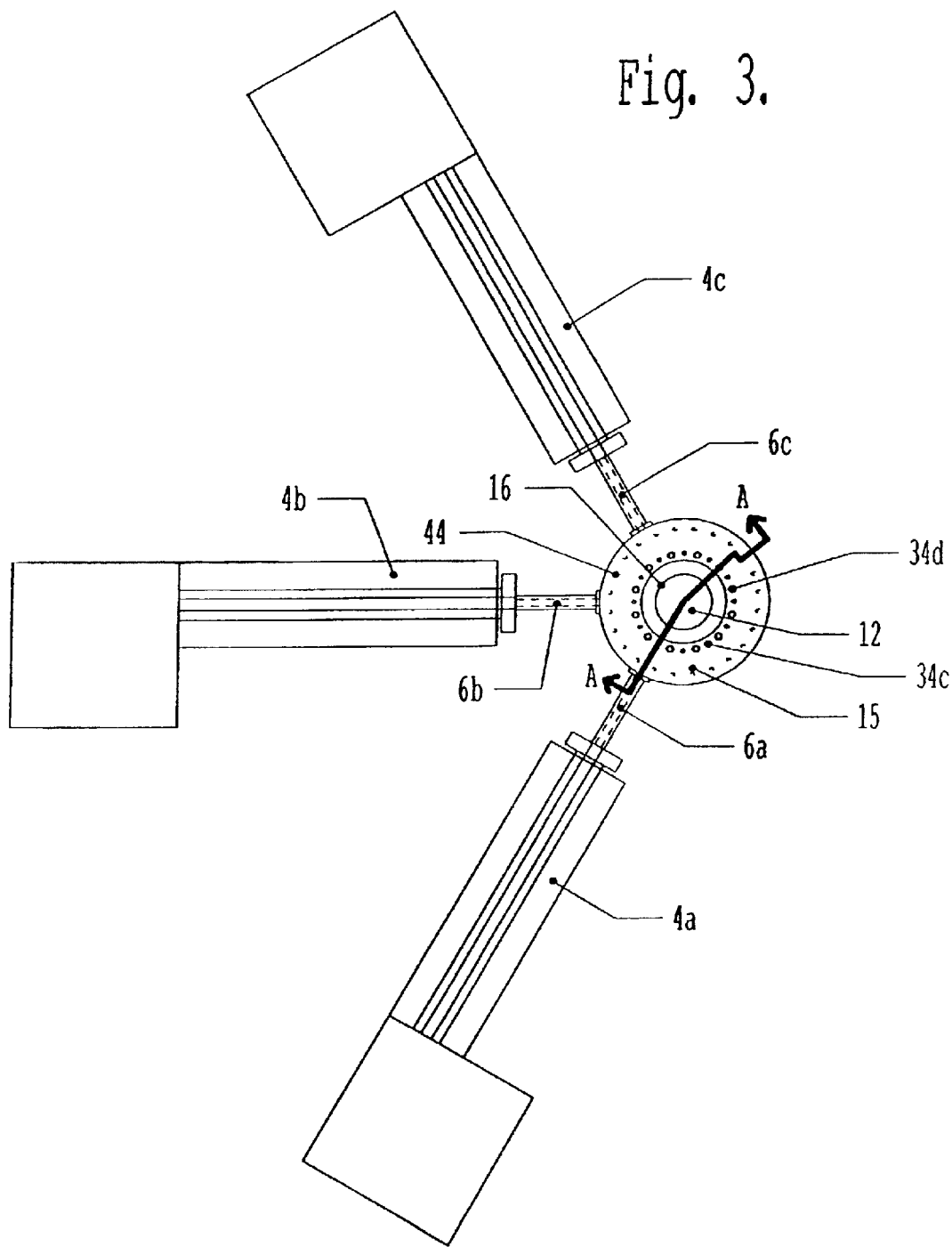
FIG. 3 is a plan view of the general arrangement for a typical multi-layer blown film extrusion die.

FIG. 2 shows a schematic cross section side view of the blown film extrusion die 10 of the regular division type with multiple die layers 30a, 30b and 30c. Die layers 30a, 30b and 30c are essentially identical, and are rotated relative to each other as shown in FIG. 3. Each layer converts melt feeding in from a respective melt pipe 6a–6c to cylindrical plastic melt flow 14 which is conveyed toward die lip 16 around a cylindrical inner mandrel 12. Thus, layer 30a converts melt flow from melt pipe 6a to melt flow 14a, layer 30b forms a second cylindrical plastic melt flow 14b which is conveyed toward die lip 16 around cylindrical plastic melt flow 14a and inner mandrel 12, and layer 30c forms a third cylindrical plastic melt flow 14c which is conveyed toward die lip 16 around cylindrical plastic melt flows 14b and 14a, and inner mandrel 12. The three cylindrical plastic melt flows 14a, 14b and 14c layer adjacent to each other, and thus make up the total cylindrical plastic melt flow 14 which flows between inner mandrel 12 and outer mandrel 15 until it exits through annular die lip 16. Layer 30a is held to die base 11 by multiple bolts 34a. Layer 30b is stacked on top of and held to layer 30a by multiple bolts 34b. Layer 30c is stacked on top of and held to layer 30b by multiple bolts 34c. At the top of the stack, outer mandrel 15 is stacked on top of and held to layer 30c by a multiple bolts 34d. O-ring seals in annular seal areas 32, 32a, 32b, and 32c prevent plastic melt from flowing outward between the respective flat, axially-facing, abutting surfaces formed by die base 11, layers 30a, 30b, 30c and mandrel lip 15.

FIG. 3 shows a plan view of the general arrangement for a typical blown film extrusion die 10 of the regular division type with multiple layers such as 30a, 30b and 30c of FIG. 2. As shown in FIG. 3, layer 30a is fed from extruder 4a by melt pipe 6a. Layer 30b and associated extruder 4b and melt pipe 6b are positioned at an angle to layer 30a and associated extruder 4a and melt pipe 6a. Similarly, layer 30c and associated extruder 4c and melt pipe 6c are positioned at an angle to layer 30b and associated extruder 4b and melt pipe 6b. This angle, e.g., about 60 degrees, is chosen to be large enough to provide clearance between adjacent extruders and melt pipes. Annular die lip 16 is formed by the outside surface of inner mandrel 12 and the inside surface of outer mandrel 15. Multiple bolts 34d are arranged to hold outer mandrel in place. Multiple bolts 34b, shown on FIG. 2, are directly beneath multiple bolts 34d. Multiple bolts 34a and 34c, also shown on FIG. 2, are one above each other and positioned in between stacked multiple bolts 34b and 34d so as not to interfere with one another. Any number of layers can be accommodated by this approach simply by stacking and bolting them in place as demonstrated in FIGS. 2 and 3.

Figure 4A:
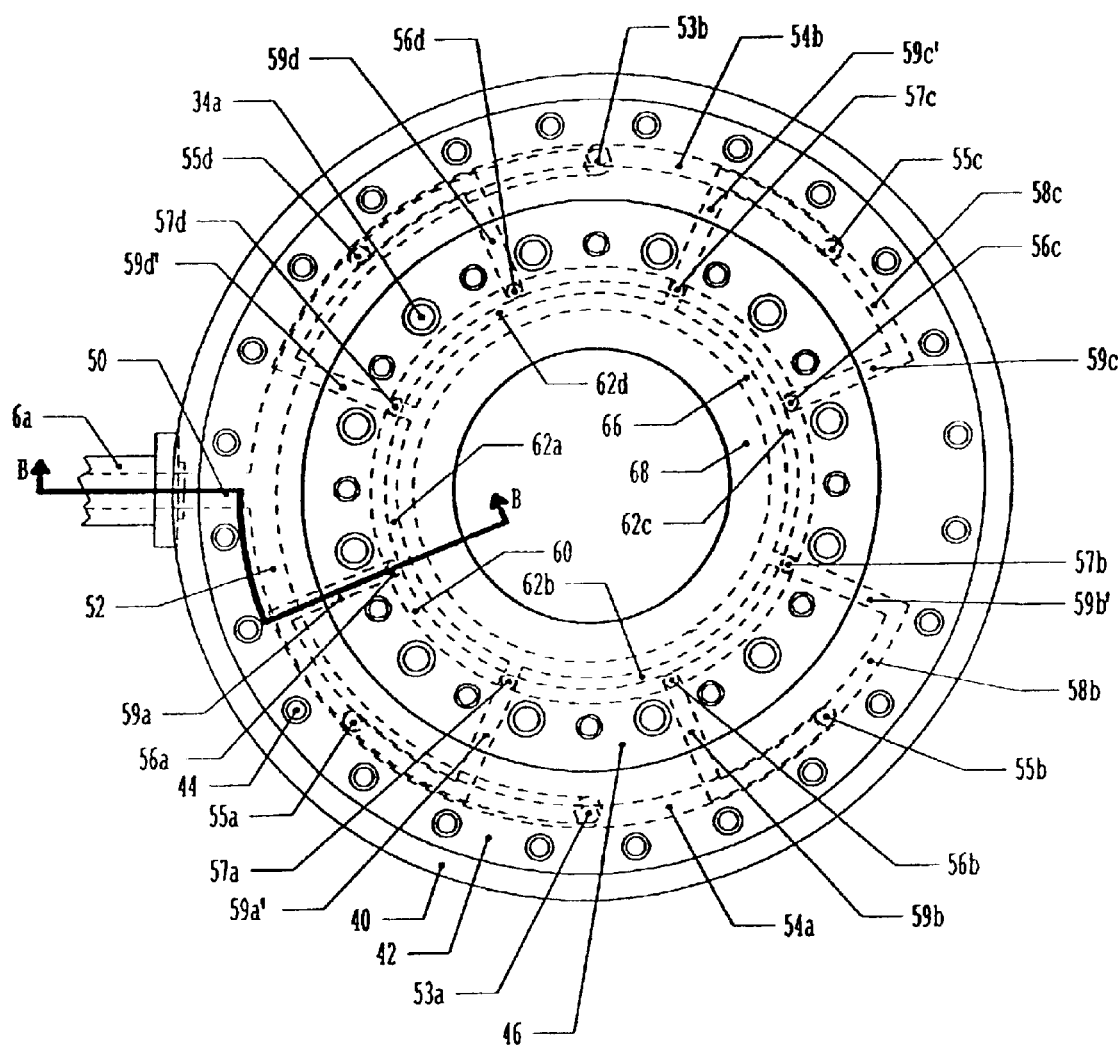
FIG. 4a is a plan view of one layer of the regular division die of FIG. 1, showing the general locations of the feed inlet, dividing channels, recombination ports and channels.

FIG. 4 is an enlarged cross-sectional view of a portion of the die 10 of FIG. 1 that includes layer 30a, and FIG. 4a is a top plan view. Layer 30a is composed of a series of concentric rings (feed ring 40, distribution ring 42 and recombination rings 45, 46) one inside of the other, that perform the functions of feeding, distribution, and then recombining the flow of molten extruded material. In the illustrated embodiment, plastic and polymer flow passes radially through feed passage 50 to the outside diameter of distribution ring 42.

Feed ring 40, as shown most clearly in FIGS. 4 and 4a is annular and has a generally vertical surface to which melt pipe 6a is attached, and a feed passage extending radially through it to a stepped inner surface that engages the outer radially directed surface of annular distribution ring 42.

Distribution ring 42, in turn, defines a outer radially-facing surface that forms a series of annular steps 42a, 42b, 42c, each of which has a generally vertical (but slightly sloped) radially-facing wall, and which in this embodiment are separated by flat, parallel (to each other and perpendicular to the axis of the die and layer) annular surfaces. The underside of the top, largest diameter wall portion 42a and the underside of the middle diameter wall portion 42b, seal against corresponding surfaces formed at the inner radial diameter of feed ring 40. The O-rings 43a and 43b provide seals at the abutting surfaces, and bolts 44 (see FIG. 2) hold the distribution ring and feed ring tightly together.

At its interior side, distribution ring 42 includes an annular divider plate portion 42d, centered on the overall height of the distribution ring but itself having a vertical height (measured along the axis of the distribution ring and die) that is not more than about 20% that of the overall distribution ring 42. As shown most clearly in FIG. 4, in the illustrated embodiment, the top and bottom surfaces of divider plate portion 42d are flat and parallel to each other throughout most of the radial width of the divider plate portion, but taper towards each other adjacent the divider plate portion's inner edge.

Recombination rings 45 and 46 overlie the top and bottom of divider plate portion 42d, and are bolted together by bolts 34a. Adjacent their radially inner edges, recombination rings extend radially inwardly of the inner radial edge of divider plate portion, are closely adjacent to each other, and terminate close to the outer surface of inner mandrel 12.

The principal function of distribution ring 42 is to divide the single flow from feed ring 40 into a number (i.e., $2^2$ in the preferred embodiment $2^3$, i.e., 8) of identical flow portions. To accomplish this, a series of flow division channels 52, 54 and 58 are machined into the outer, generally vertical radially facing surface of step 42b. The size and/or quantity of division channels (channels 52, 54 and 58 are shown in the illustrated embodiment) are limited only by the vertical dimension of the outside diameter of distribution ring 42. Flow division channels 52, 54 and 58 divide the melt from feed passage 50 of feed ring 40 into eight separate radial port flows 59. Because most of the flow is between the radially-facing surfaces of the feed ring 40 and distribution ring 42, it will be evident that the forces 41a and 41b, along the die axis, which tend to move the distribution ring 42 and feed ring 40 apart are relatively small since they act only on the projected area (from a plan view) between seals 43a and 43b.

The arrangement of the division channels is shown most clearly in FIG. 4b, which is a fold out (or unwrapped) schematic illustrating the radially-outward facing surface of wall portion 42b of division ring 42. As shown, division channels 52, 54 and 58 all extend circumferentially around the outward facing surface of the division ring, and lie generally perpendicular to the axis of the die. Flow from inlet feed passage 50 passes downwardly (through a short channel 51 extending parallel to the die axis and generally perpendicular to division channel 52, into the center of division channel. Channel 52 wraps a total of 180 degrees around the exterior of distribution ring 42, 90 degrees in opposite directions from the point at which the flow from inlet 50 is introduced into channel 52, and separates the melt flow from inlet 50 into two oppositely directed flows. At each of the ends of channel 52, a short vertical channel 53a, 53b directs the flow in the respective half of channel 52 (axially of the die layer) into the center of a respective one of flow channels 54a, 54b. Division channels 54a, 54b each wrap a total of 90 degrees (45 degrees in each direction from the point at which flow from a channel 53a, 53b is directed into the respective channel 54a, 54b) around the exterior of distribution ring 42, and divides the melt flow from channels 53a, 53b into a total of four flows. At each end of each division channel 54a, 54b, each respective flow portion is again directed vertically a short distance, through a short channel 55a–55d, into the center of a respective one of division channels 58a–58d. Division channels 58a–58d each wrap 45 degrees (22.5 degrees in opposite directions from the point at which flow from channel 55a–55d is directed into the respective division channel 58a–58d) around the outside of distribution ring 42) and again divide the flow, this time into a total of eight equal flow portions. At each end of each of distribution channels, the respective flow portion is directed into one of eight radial channels 59a–59d and 59a'–59d', which convey the flow portion radially through distribution ring 42 to (as shown in FIGS. 2 and 4) either the upper (in the case of channels 59a, b, c, d) or the lower (in the case of channels 59a', b', c', d') surface of divider plate portion of the distribution ring. As shown, each radial channel 59a–59d and 59a'–59d', extends radially inwardly from a respective one of division channels 58a–58d to the respective surface of divider plate portion 42d, at a point just radially outwardly of the tapered portion of the divider plate portion. The polymer melt flow from division channels 58a–58d is equally split to the top and bottom of the divider plate portion; half goes to upper ports 56a, 56b, 56c and 56d and the other half to lower ports 57a, 57b, 57c and 57d.

It will be noted that all of flow passages 50, 52, 54a, 54b, 58a–58d, 59a–59d and 59a'–59d' of distribution plate 42 are symmetrical such that the path length that melt must travel to reach each port is equal, ensuring even distribution.

At recombination ring 46 upper ports 56a, 56b, 56c and 56d on the upper side of divider plate 42d evenly distribute their associated melt flow to four equally spaced positions between the upper side of the divider plate and upper recombination ring 46. At ring 45 lower ports 57a, 57b, 57c and 57d evenly distribute their melt flow to four equally spaced positions between the lower side of the divider plate and lower recombination ring 45. The positions at the upper side of the divider plate are midway between those positions at the lower side of the divider plate.

Figure 5:
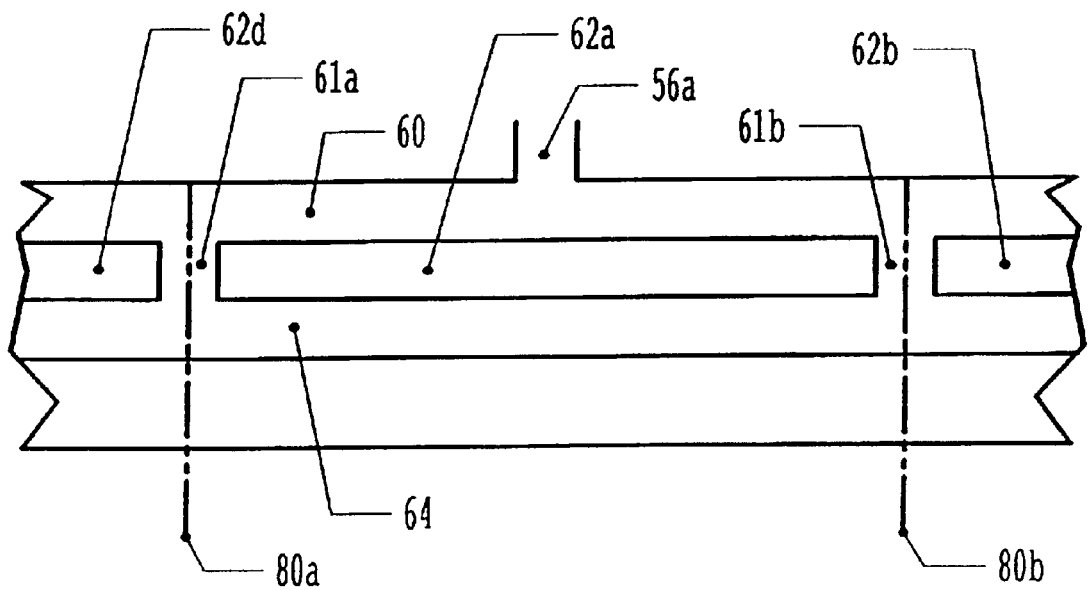
FIG. 5 is a schematic illustration of an upper recombination channel and associated land area, as viewed looking upwardly from the upper surface of the tapered portion of the distribution plate.

As most clearly shown in FIGS. 4 and 5, a pair of radially-spaced circular channels 60, 64 are cut into the lower surface of recombination plate 46 and a similar pair of radially-spaced circular channels 70, 74 are cut into the upper surface of recombination plate 45. A plurality of arcuate recombination lands 62a–62d are provided in the lower surface of recombination plate 46 between channels 60, 64, and a similar plurality of arcuate recombination lands 72a–72d (72b and 72c are not shown) are provided in the upper surface of recombination plate 45 between channels 70, 74. Final lands 66, 76 are provided in, respectively, the lower surface of recombination plate 46 between channel 64 and the inner radial edge of divider plate of distribution ring 42, and the upper surface of recombination plate 45 between channel 74 and the inner radial edge of the divider plate. In this embodiment each arcuate land subtends an area of slightly less than 90°.

In general, melt flows from radial channels 59a–59d and 59a'–59d' either into channel 60 through ports 56a–56d or into channel 70 through ports 57a–57d. From the outer channels 60, 70 of the recombination rings, the melt flows inwardly, over respective recombination lands 62a–62d, 72a–72d or through recombination channels 61a–61d, 71a–71d (61c, 61d, 71b, 71c, and 71d are not shown) between adjacent ends of portions of the lands, to inner recombination channels 64, 74. The upper melt then flows out of inner recombination channel 64 between final land 66 and divider plate 42d; while the lower melt flows out of inner recombination channel 74 between final land 76 and divider plate 42d. Recombination seals 47 and 49 prevent melt from leaking outward from outer recombination channels 60 and 70 respectively. The upper and lower melt flows join at the inner tip of divider plate 42d forming combined flow 68 that is conveyed inward to the outside wall of inner mandrel 12 where it forms cylindrical plastic melt flow 14a.

In the illustrated embodiment, the recombination channels, recombination lands, and final land are cut into the surfaces of recombination rings 45, 46 and the facing upper and lower surfaces of divider plate 42d of distribution ring 42 are generally flat. In other embodiments some or all of these may be cut into the divider plate.

The arrangement of the recombination channels and lands at the lower surface on upper recombination ring 46 is shown most clearly in FIG. 5, which is a schematic, straightened out plan view of the recombination areas symmetrical about port 56a, viewed from above. Flow enters outer recombination channel 60 through upper port 56a; as viewed in FIG. 4a, one half flows clockwise down outer recombination channel 60 toward upper port 56d and the other half flows counterclockwise toward upper port 56b. As the melt flows in opposite directions down (i.e., circumferentially of the die) the channel, some of the polymer melt flows radially inwardly across recombination land 62a to inner channel 64. The rest of the melt flows circumferentially in channel 60 until it reaches the ends of recombination land 62a (which is centered on port 56a and subtends an arc of slightly less than 90 degrees), at which point it meets the similar but opposing melt flow originating from upper ports 56d and 56b. Here the opposing flows join or "weld", forming high flow weld lines 80a and 80b respectively. These joined flows turn and flow inward through the respective radial recombination channels 61a and 61b at the opposite ends of land 62a into inner recombination channel 64.

In inner recombination channel land 64, the melt flows both radially inwardly across final land 66 as well as in opposite circumferential directions down inner recombination channel 64. The flow down the inner recombination channel 64 is layered on top of flow coming across recombination land 62a, and also flows radially inwardly across final land 66. The profile (i.e., configuration) of the flow radially inwardly of final land 66 depends largely on the design of the final land, which as discussed hereinafter may be designed with variable lengths and/or gaps to program a desired melt flow profile.

Figure 5A:
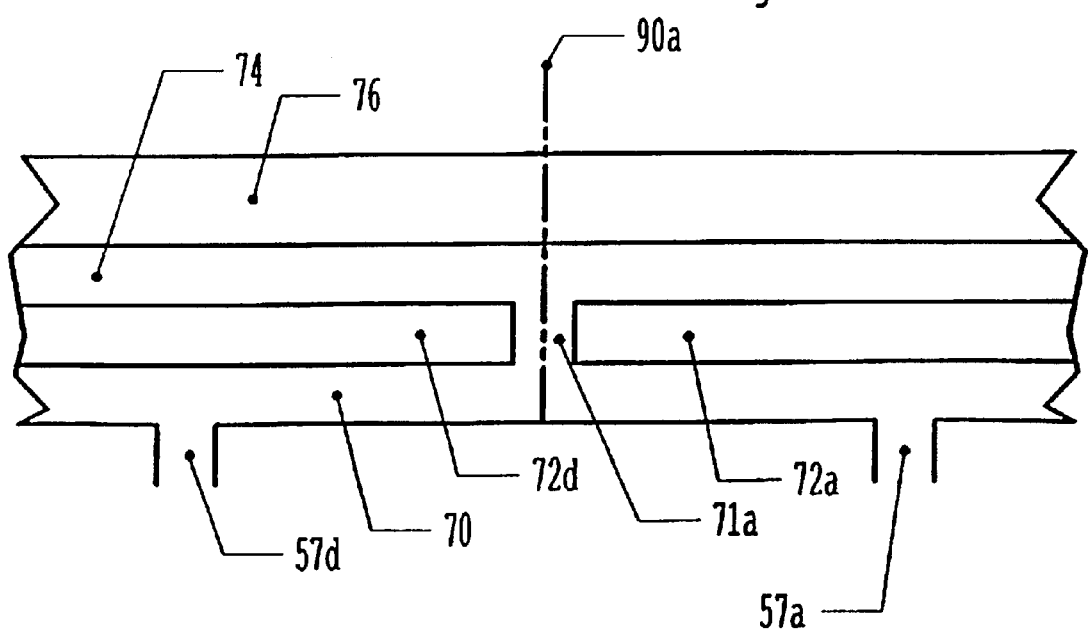
FIG. 5a is a schematic illustration of a lower recombination channel and land area as positioned relative to FIG. 5, viewed looking downwardly from the lower surface of the tapered portion of the divider plate.

FIG. 5a is similar to FIG. 5, except that FIG. 5a shows the arrangement of the recombination channels and lands at the lower recombination area between the lower surface of divider plate portion and lower recombination ring 45, viewed from above. Although the flow into the lower recombination area is from ports 57a–57d, FIG. 5a illustrates the arrangement symmetrical about upper port 56a to the upper recombination area so that the relationship between the upper recombination area (of FIG. 5) and lower recombination area (of FIG. 5a) is most easily appreciated.

In the lower recombination area, flow enters outer recombination channel 70 through lower ports 57d and 57a (shown, and also through lower ports 57b and 57c although not shown in FIG. 5a). As in the upper recombination area, the flow from each port flows down outer recombination channel, one half of the flow from each port flowing clockwise and the other half counterclockwise. As described in connection with FIG. 5a, part of the flow in channel 70 flows radially inwardly over one of recombination lands 72d and 72a, and the melt flow remaining at the ends of the lands welds together to form a high flow weld line 90a, and flows inwardly through radial recombination channels 71a into inner recombination channel 74. In the inner recombination the melt flows radially inwardly across final land 76, as well as in opposite directions down inner recombination channel 74 where it is layered under flow coming across recombination lands 72d and 72a. As in the upper recombination area, final land 76 is designed with variable lengths and/or gaps to program a desired melt flow profile.

It will be recognized that the recombination lands 62a–62d and land channels 61a–61d of the upper recombination area are offset at 45 degrees from the lands 72a–72d and channels 71a–71d in the lower recombination area. This arrangement places high flow weld lines from one recombination ring radially in line with ports from the opposing recombination ring.

Figure 6:
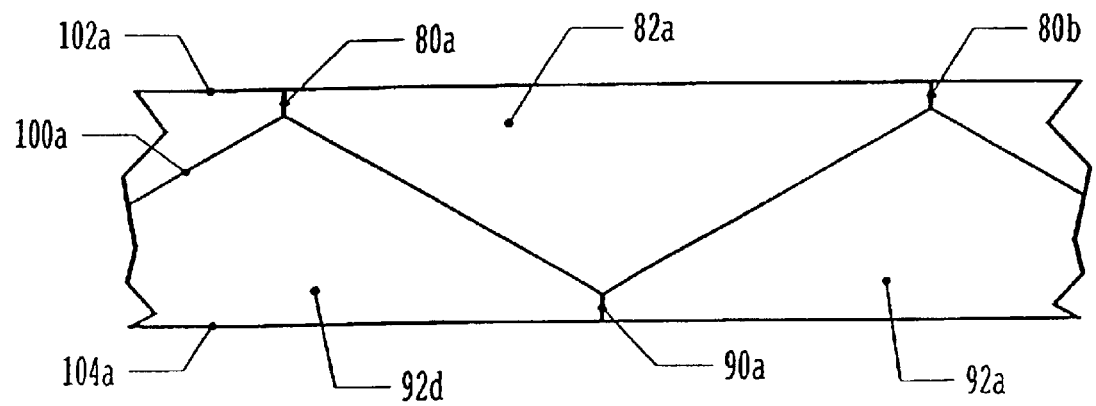
FIGS. 6 and 6a are schematics cross sections of typically desirable flow proportions from upper and lower recombination rings.
Figure 6A:
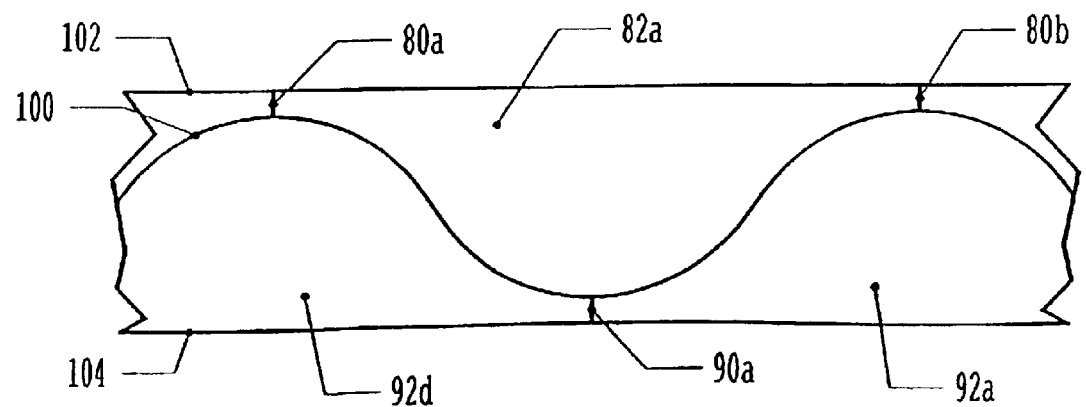

FIGS. 6 and 6a show two preferred melt flow profiles that exhibit regular division, i.e., the cross-sections of the flows from the upper and lower recombination areas are identical and fit together with no intervening space. High flow weld lines 80a and 80b (also 80c and 80d, not shown) occur in the low flow areas of final land 66. High flow weld lines 90a (also 90b, 90c and 90d, not shown) occur in the low flow areas of final land 76. When the upper and lower melt flows join at the inner tip of divider plate 42d forming combined flow 68, the opposite recombination rings high final land flow area is added and washes the effects of the weld lines out. By choosing the shape of the flow profiles 82a–82d and 92a–92d to be regularly divided, they all interlock to form a evenly distributed combined flow 68.

The present invention has been described in connection with certain structural embodiments and it will be understood that various modifications can be made to the above-described embodiments without departing from the spirit and scope of the invention as defined in the appended claims.

What is claimed is:

1. A method for use with an extrusion die in which material exits the die at an annular orifice in a direction generally parallel to a central axis of the die, the method comprising:

receiving a flow of material and dividing it into a first flow and a second flow within a die layer;

providing the first flow to a first annular region;

providing a second flow to a second annular region spaced from the first annular region axially along the central axis, the flow to the first and second annular regions each having alternating higher flow regions and lower flow regions, the higher flow regions of the first annular region being axially aligned with the lower flow regions of the second annular region, and the higher flow regions of the second annular region being axially aligned with the lower flow regions of the first annular region; and recombining the flow from the first and second annular regions so that higher flow regions and lower flow regions combine.

2. The method of claim 1, wherein the die includes an annular distributor ring including the first and second set of flow channels, and an annular feed ring surrounding the distribution ring, the dividing occurring in a circumferential surface at one or both of the feed ring and distribution ring at their interface.

3. The method of claim 1, wherein providing the first flow includes providing the flow to $2^n$ locations spaced around the first annual region.

4. The method of claim 3, wherein providing the second flow includes providing the flow to $2^n$ locations spaced around the second annual region, each of the locations for the second flow being circumferentially midway between the locations of the first flow.

5. The method of claim 1, further comprising receiving a plurality of flows, one for each of a plurality of die layers, and for each such flow, dividing it into a first flow and a second flow.

6. An extrusion die in which material to be extruded flows radially inwardly in the die in a direction generally perpendicular to a central axis of the die and exits the die at an annular orifice in a direction generally parallel to the central axis, the die including a plurality of die layers stacked one upon the other in a direction generally parallel to the central axis, each of the layers including:

an annular flow distribution ring formed in a unitary piece and having a radially outer generally cylindrical surface; and an annular feed ring surrounding and having a radially inner generally cylindrical surface engaging the outer surface of the flow distribution ring;

the feed ring and flow distribution ring of each layer including respective surfaces generally perpendicular to the axes thereof and positioned axially above and below the cylindrical surfaces thereof, the feed ring and flow distribution ring having a similar length in the axial direction;

the feed ring includes a flow channel extending generally radially outwardly from the inner surface of the feed ring and providing for flow of material through the feed ring from an outer surface of the feed ring; and the inner surface of the feed ring and the outer surface of the flow distribution ring define therebetween a series of circumferentially extending channels arranged to divide flow from the flow channel into a plurality of substantially identical flow portions.

7. The die of claim 6, further comprising seals between adjacent die layers to prevent flow between surfaces of adjacent die layers, wherein the seals are provided between adjacent engaged surfaces generally perpendicular to the central axis of the die.

8. The die of claim 6, wherein the distribution ring includes a plurality of flow channels each of which extends from a respective one of the circumferentially extending channels radially inwardly through at least a portion of the radial thickness of the distribution ring and provides for flow of a respective one of the flow portions therethrough.

9. The die of claim 7, wherein in each layer seals are provided between surfaces of the feed ring thereof perpendicular to the axis of the die and respective surfaces of the distribution ring thereof perpendicular to the axis of the die.

10. An extrusion die in which material exits the die at an annular orifice in a direction generally parallel to the central axis of the die, the die comprising:

an annular distribution ring arranged to provide for flow through a plurality of flow channels;

a first set of flow channels providing flow to a first annular surface;

a second set of flow channels providing flow to a second annular surface;

a third surface facing and spaced from the first surface and arranged to provide for a first flow therebetween such that the first flow includes a first weld region of relative low flow and regions of relatively higher flow adjacent thereto;

a fourth surface facing and spaced from the second surface and arranged to provide for a second flow from the second set therebetween such that the second flow therebetween includes a second weld region of relatively low flow and regions of relatively higher flow adjacent thereto, the first and second surfaces facing generally away from each other and in generally opposite direction, wherein the first weld region is circumferentially offset to the second weld region, and is arranged such that the first flow is joined with the second region with the first weld region of the first flow adjacent a region of relatively higher flow of the second flow and with the second weld region of the second flow adjacent a region of relatively higher flow of the first flow.

* * * * *